United States Patent [19]

Wilson et al.

[11] Patent Number: 4,594,255

[45] Date of Patent: Jun. 10, 1986

[54] SUGAR-FREE CHEESECAKE FILLING AND DRY MIX FOR PREPARATION THEREOF

[76] Inventors: Mildred N. Wilson, 133 Old Kings Hwy., Wilton, Conn. 06897; Wayne L. Steensen, 6 Edelweiss La., Ridgefield, Conn. 06877

[21] Appl. No.: 774,329

[22] Filed: Sep. 10, 1985

[51] Int. Cl.$^4$ ............... A23L 1/187; A23L 1/04; A23C 19/086

[52] U.S. Cl. .................... 426/578; 426/582; 426/613; 426/658; 426/804

[58] Field of Search ............ 426/578, 613, 582, 573, 426/658, 804

[56] References Cited

U.S. PATENT DOCUMENTS 3,455,698  7/1969  Vakaleris ..................... 426/582
4,409,255 10/1983  Danielson ..................... 426/576
4,427,709  1/1984  Guhl ............................ 426/578

*Primary Examiner*—Jeanette Hunter
*Attorney, Agent, or Firm*—Richard Kornutik

[57] ABSTRACT

A dry mix which is hydrated with aqueous milk medium to form a sugar-free cheesecake filling is disclosed, the dry mix containing a high percentage of dried milk solids, and also containing fat, emulsifier, starch, phosphate gelling agents, cheese flavor and/or cheese solids, a non-sugar sweetening agent, and a significant amount of a maltodextrin having a dextrose equivalent of from 3 to 15 and a bulk density of at least about 10 pounds per cubic foot. Notwithstanding the absence of sugar and the large amount of milk solids, the dry mix is readily dispersible in the hydrating medium and produces a cheesecake filling of excellent body and texture.

15 Claims, No Drawings

SUGAR-FREE CHEESECAKE FILLING AND DRY MIX FOR PREPARATION THEREOF

BACKGROUND OF THE INVENTION

The present invention relates to cheesecakes and, more particularly, to a dry mix which, when admixed and agitated with milk, provides a stable, set, sugar-free filling for preparation of cheesecake without need for heating or cooking.

Cookbooks abound with recipes for preparation of cheesecake fillings, and perhaps no other prepared food product exists in so many and varied formulations and textural/physical characteristics under a single name. In general, however, basic formulations include cream cheese and auxiliary components which can be transformed into a dense compact filling or, through excessive air incorporation during mixing and/or folding in of a whipped cream or beaten egg white component, into a lighter more aerated texture. To produce a sufficiently stable structure to serve as a filling, particularly for the lighter aerated products, many recipes call for inclusion of eggs or egg whites and a baking step to coagulate and set the egg proteins, and/or call for use of agents such as gelatin.

As with a variety of other food products, manufacturers have become attuned to the need to provide the consumer with a cheesecake product whose preparation is not so involved or time-consuming as traditional recipes, yet which is closely similar to a homemade product in taste and texture. One obvious route to this goal is the provision of a fully-prepared cheesecake in frozen form, requiring only a defrosting period before serving. Problems are encountered by manufacturers and consumers alike with such products, however, in terms of required storage conditions and storage space.

The provision of a dry mix composition which can be hydrated by the consumer to form a cheesecake filling offers significant possibilities in terms of consumer convenience, ease of shipping and storage, and shelf-life, and compositions of this type have been described in the prior art (see, e.g., U.S. Pat. Nos. 3,455,698 and 4,427,709) and have been manufactured and sold commercially. Generally, such products contain a substantial quantity of granular sugar, lesser amounts of dried milk solids, a powdered fat component (which can be in association with an emulsifier and protein source as an overall whippable component), and a source of cheese solids and/or cheese flavor. A "no-bake" aspect can be built into such products through inclusion of a suitable cold-temperature gelation system such as the phosphate gelling agents developed for instant pudding products which react with milk proteins to form gels. Starch thickeners also may be employed for attainment of a desired texture.

Dietetic and other concerns also have led to the desirability of providing dry mix compositions which can be hydrated to produce sugar-free cheesecake fillings. Mixes of the no-bake variety are of particular interest in this regard, since a currently preferred non-sugar sweetening agent, aspartame, cannot be employed in baked products. However, notwithstanding the ready availability of non-sugar sweetening agents to the food formulator, the provision of a dry mix of this type which produces a completely acceptable sugar-free filling has been found to involve a number of difficult technical problems. The identification and solution of these problems, as set forth in detail hereinafter, form the basis for the present invention and result in the provision of a highly acceptable dry mix composition and cheesecake filling.

SUMMARY OF THE INVENTION

The cheesecake mix of the present invention comprises a sugar-free particulate, intimate admixture of milk solids, fat, a pregelatinized starch, a source of cheese flavor and/or cheese solids, phosphate gelling agents, an emulsifier, a non-sugar sweetening agent such as a dipeptide sweetener and a significant amount of a relatively low dextrose equivalent maltodextrin having a specified bulk density. The mixture is adapted to be admixed and hydrated with an aqueous milk ingredient, such as whole milk, low-fat milk, etc., to produce a sugar-free cheesecake filling having excellent taste and textural characteristics.

Conversion of a sugar-containing dry cheesecake mix composition to a mix which produces a sugar-free filling obviously requires deletion from the starting formulation of any and all sugar or sugar-containing components. Replacement of the sweetening properties of the deleted sugar can be effected by inclusion in the formulation of a suitable non-sugar sweetening agent such as saccharin, aspartame or the like. These sweetening agents may in some cases require a certain degree of modification or enhancement in order to more closely simulate the particular sweetness and flavor characteristics of sugar, but, generally speaking, are quite suitable in providing an overall level of sweetness similar to that of the sugar-sweetened counterpart products.

The most pronounced problem in formulating a sugar-free cheesecake mix and filling is that removal of sugar from a sugar-containing formulation can involve elimination of anywhere from, e.g., 25 to 55 percent of the weight of the dry mix. Because of the extreme sweetening potency of the non-sugar sweetening agents relative to sugar (sucrose), this replacement is offset only minimally (e.g., on the order of 0.3 to 0.6% of the dry mix) by inclusion of these agents in the mix at the amount required to attain an equivalent degree of sweetness. In order that the hydrated mix provide a cheesecake filling of the same consistency and texture as its sugar-sweetened counterpart, this drastic loss in solids must somehow be compensated for.

This same removal of sugar and loss of solids has an additional effect. A hallmark in the eyes of the consumer in terms of the acceptability of a hydratable dry mix is its ready and complete, lump-free dispersibility and dissolvability in the hydrating medium. Wholly apart from aesthetic considerations, poor dispersibility can in fact lead to equally poor final product characteristics. A major function of sugar in dry mixes for cheesecake fillings is to promote liquid dispersibility of the many and varied components of the mix, and is particularly important in cheesecake mixes which contain difficult to disperse dried milk solids, starch, colors, cheese solids and the like. When sugar is eliminated from the formulation, dispersibility of the remaining components can be problematical. Indeed, the problem can become even more pronounced than anticipated because often times the earlier discussed loss of solids occasioned by sugar elimination is sought to be compensated for by increasing levels of, e.g., milk solids. Dispersibility of such formulations thus becomes even more difficult, and the solving of one problem only leads to augmentation of another.

The prior art is not entirely unfamiliar with these technical barriers, but most teachings are overly generalized with respect to replacing sugar with a non-sugar sweetener and "suitable" non-sugar bulking agents. A host of functional considerations necessarily must be taken into account when a large quantity of sugar is removed from a dry mix and from the ultimate hydrated product, particularly for highly texture-dependent products such as cheesecake. Many replacement or "bulking" agents may have characteristics which restrict their use as a total replacement (with sweetening agent) for sugar, such as inherent off-flavors which become pronounced at substantial levels of usage; they may be incapable of promoting dispersibility, particularly when other formulation modifications have exacerbated the dispersibility problem; they may have their own inherent dispersion problems; or they may affect processing characteristics.

One important area that has received little attention relates to package filling and size considerations. Many of the so-called bulking agents are true to their name in that they are of extremely low density and add considerably to the overall dry mix volume. Indeed, it is felt by some that the low density is required in order to insure the agent's own ready dispersibility and to aid in dispersion of remaining ingredients. However, where a filling and packaging line and packaging components have been designed and used with a sugar-containing formulation of specified bulk density, a decrease in such density will necessitate re-design of packaging materials and re-calibration or even re-design of filling and packaging equipment. Consistency of product volume/bulk density as between sugar-containing and sugar-free formulations thus imposes an additional and considerable constraint on the food formulator seeking to solve all the earlier-mentioned functional difficulties resulting from sugar replacement.

The dry mix formulation according to the present invention has been found to attain all the sought for dry mix characteristics and to produce a cheesecake filling closely similar in organoleptic and functional characteristics to a sugar-sweetened counterpart product. In many respects this achievement is quite significant and resulted from experimentation with a number of different possible ingredients and formulation ranges.

In particular, the dry mix of the invention contains no sugar and the suitable degree of sweetness in the final cheesecake filling product is attained by inclusion in the mix of a non-sugar sweetening agent, aspartame being greatly preferred. The mix contains a relatively high level of dried milk solids, preferably dried non-fat milk solids, which normally would give rise to difficulties with dispersibility characteristics of the mix. However, we have found that inclusion in the dry mix of from about 10 to about 35% by weight of a maltodextrin having a dextrose equivalent in the range of from about 3 to about 15 results in a product mix of excellent dispersibility as to all components. Moreover, the maltodextrin employed is of a reasonably high bulk density, i.e., at least about 10 pounds per cubic foot and generally in the range of from about 10 to 25 pounds per cubic foot, such that, at the amount employed, effective dispersibility is attained yet the overall product volume/bulk density of the dry mix is such as to be compatible with processing and packaging using existing machinery and package sizes developed for sugar-containing cheesecake mixes. In addition, the type maltodextrin employed and the level thereof in the mix, in combination with the other ingredients, produces a cheesecake filling which is highly acceptable in terms of texture and body characteristics.

DETAILED DESCRIPTION OF THE INVENTION

The cheesecake mix of the invention is a dry, particulate, free-flowing, sugar-free, hydratable admixture of a number of components. As understood in the art, the term "dry" is used to define a moisture content sufficiently low so as to insure stability against microbial contamination, prevent moisture-induced caking or lumping of ingredients in the package and insure reaction or interaction stability for and among all ingredients. Generally, the moisture content of the mix will be below 6% by weight, and preferably will be below 4% by weight.

The particulate nature of the mix is such as to promote, insofar as possible, dispersibility of ingredients in the hydrating medium and insure that the hydrated product not contain any undissolved large particles. The desired particle size or particle size distribution can be attained by selection of individual ingredients of desired size and/or by grinding or milling of parts or all of the composite mixture of ingredients.

The major component of the dry mix formulation consists of dry milk solids, preferably non-fat dry milk solids. Other milk solids such as skim milk solids, buttermilk solids and the like may also be employed, preferably in combination with non-fat dry milk solids. The term "milk solids" also is used to include caseinates which, while not generally preferred for use at any substantial level, can have functionality as a proteinaceous encapsulating agent in powdered fat composition as discussed hereinafter.

Generally, the overall milk solids content of the dry mix will be on the order of from about 30 to 65% by weight of the mix, and most preferably from about 40 to 55% by weight. A particularly preferred formulation will contain non-fat dry milk solids in an amount of from 30 to 45% by weight of the mix and buttermilk solids in an amount of from about 8 to 14% by weight.

The milk solids contribute flavor and body to the cheesecake filling and their presence at relatively high levels will in part offset solids lost as a consequence of sugar removal. A significant feature of the invention is the ability to formulate a mix of such high milk solids content while still presenting a product which is capable of rapid and complete dispersion in the hydrating milk medium. As a consequence, the cheesecake filling has a highly suitable texture and body notwithstanding the absence of sugar.

The dry mix of the invention also will contain a fat component which aids in provision of a cheesecake filling having a desirably smooth texture reminiscent of homemade products. The fat, preferably a fully or partially hydrogenated vegetable oil or mixture of oils (e.g., coconut oil, palm kernel oil, soybean oil), most typically will be provided in the form of a powdered fat composition comprised of fat particles encapsulated in a coating of water soluble carbohydrate and proteinaceous ingredients along with an emulsifier component. Consistent with the goal of the invention, i.e., provision of a sugar-free cheesecake filling, carbohydrate used in the powdered fat composition must be non-sugar carbohydrate.

In terms of individual components relative to the dry cheesecake filling mix, the fat per se will generally be present in the dry mix in an amount of from about 5 to 20% by weight, most preferably from about 5 to 10% by weight. Emulsifiers, which may, for example, be mono- and di-glycerides, acetylated monoglycerides, propylene glycol esters of fatty acids, and the like, generally will be present at a total level of about 0.3 to about 3.0% by weight of the dry mix, most preferably from about 0.8 to 2.1% by weight. When the fat is present as part of a carbohydrate and protein solids encapsulating system, presence of the requisite degree of fat in the dry mix will carry along with it from about 1 to about 5% carbohydrate by weight of the mix and from about 0.5 to about 2.0% protein by weight of the mix. A preferred proteinaceous ingredient in powdered fat compositions is a soluble form of casein, such as sodium caseinate, and, as earlier explained, any amount thereof added by way of the fat component is included herein for descriptive and level calculation purposes as part of an overall milk solids component of the dry cheesecake filling mix.

The dry mix of the invention also will contain a starch component which, in the hydrated cheesecake filling, aids in the development of the desired cheesecake texture and body. The starch component will comprise one or more food-grade acceptable pregelatinized starches such as pregelatinized tapioca starch, pregelatinized waxy maize starch, pregelatinized corn starch and the like. Typically, the starch will be present in an amount of from about 4 to 15% by weight of the dry mix, and preferably from about 6 to 13% by weight.

The dry mix also will contain a suitable quantity of dried cheese solids and/or cheese flavor ingredients, generally in a total amount, by weight of the dry mix, of anywhere from about 5% to about 25%, but most preferably at a level of from about 4 to 10% by weight of the mix. The cheese solids can, for example, be dehydrated cheddar cheese solids, cottage cheese solids, cream cheese solids or the like, and, where desired, concentrated cheese flavors may also be employed. As is known in the art, cheese solids also can be provided by means of so-called cheese powders which contain a substantial quantity of non-fat dry milk solids but nevertheless are denominated as cheese. In such cases, the amount of overtly added non-fat dry milk solids per se in the dry mix can be decreased with the balance being provided in the form of a cheese powder. In either event, the "milk solids" percentages for the dry mix herein contemplate inclusion of milk solids provided as part of a cheese additive component.

To impart the desired degree of sweetness to the cheesecake filling, the dry mix is provided with a suitable quantity of a non-sugar sweetening agent. The most preferred non-sugar sweetening agent is the dipeptide aspartame, but any other suitable agent may be employed such as saccharin, cyclamate, other sweet dipeptides, Acesulfame K, and the like. The precise amount employed in the dry mix will vary depending on the sweetening potency (relative to sucrose) of the particular agent used, but generally the level will be in the range of from about 0.2 to about 1.0% by weight of the dry mix, and more typically from about 0.3 to about 0.6% by weight.

The dry mix also includes phosphate setting or gelling agents which interact with milk proteins to form a gelled structure in the cheesecake filling. Alkali metal phosphates are the preferred gelling agents, and most preferably alkali metal pyrophosphates and orthophosphates. Principal among the former are the di- and tetra- sodium and potassium pyrophosphates, and of the latter, sodium, potassium or calcium orthophosphates. The gelling agents will generally comprise from about 1 to 3% by weight of the dry mix. A preferred gelling system comprises a combination of tetrasodium pyrophosphate and calcium orthophosphate.

As discussed earlier, a key feature of the present invention is the finding that a particular maltodextrin can be employed as a relatively major component of the dry mix and has the effects of: contributing significantly to replacement of solids lost by absence of sugar so as to provide a cheesecake filling of body and texture closely similar to that attained in sugar-containing cheesecake formulations; not at all adversely affecting any desired organoleptic or functional characteristics of the filling; and promoting the dispersibility of the mix ingredients in the hydrating medium. The last effect is particularly noteworthy since the overall formulation contains a high level of normally difficult to disperse milk solids, cheese solids, starch, colors, and the like, and since the maltodextrin employed is of relatively high density as compared to many other possible "bulking" agents.

In particular, the dry mix of the invention contains from about 10% to about 35% (based on the weight of the dry mix) of a maltodextrin having a dextrose equivalent (D.E.) of from about 3 to 15 and having a bulk density of at least about 10 pounds per cubic foot (this and all other bulk densities referred to herein are measured as untapped bulk densities according to methods well known in the art). Preferably, the maltodextrin will have a D.E. in the range of 9 to 12 and a bulk density in the range of from about 10 to 25, and most preferably from about 13 to 19 pounds per cubic foot. Higher bulk densities for the maltodextrin will, of course, still be consistent with the overall goal of consistency of product volumes as between sugar and sugar-free dry mixes, but at these higher densities the maltodextrin is a less effective dispersing agent and may require usage at greater amounts than is consistent with final product flavor and texture goals. The pH of the maltodextrin (measured as a 20% aqueous solution) generally is in the range of about 4.0 to 5.5.

A preferred level of addition of the maltodextrin in the dry mix is from about 15 to 30% by weight of the dry mix, and most preferably from about 17 to 27% by weight.

This same maltodextrin may be employed as the carbohydrate component of a powdered fat composition included in the dry mix, and when such is the case the weight percents given above will be inclusive of the maltodextrin added in this manner. Indeed, another important feature of the invention is the ability to employ a suitable powdered fat composition containing non-sugar carbohydrate solids (in place of sugar solids commonly present in such compositions) yet still retaining intended functionality and overall bulk density consistent with product specifications.

The particulate dry cheesecake filling mix of the present invention generally will be formulated to have an overall bulk density of at least about 25 pounds per cubic foot, and preferably will be in the range of from about 25 to 40 pounds per cubic foot, with 29 to 34 pounds per cubic foot being a most preferred range.

In preparing a cheesecake filling from the dry mix of the invention, the contents of the mix will be mixed with a suitable quantity of aqueous milk hydrating medium (generally in a weight ratio of 2:1 to 3:1 hydrating medium to dry mix weight), which can be whole milk, low-fat milk or the like. A conventional household hand mixer is used to disperse and intermix the ingredients, and the speed of the mixer can be varied so as to vary the amount of air incorporated in the filling and, hence, the denseness or lightness of the texture of the final product. The filling typically will be poured into a preformed graham cracker crumb crust and the cheesecake then chilled for several hours.

The following example provides further details of the invention.

EXAMPLE

The following ingredients are dry blended within the percent by weight dry mix ranges set forth to form a dry mix for preparation of cheesecake fillings:

| Ingredient | |
|---|---|
| Non-fat dry milk solids | 33–40 |
| Maltodextrin (D.E. 9–12; bulk density 13–19 lbs/ft$^3$) | 18–23 |
| Powdered fat (50–60% vegetable fat; 25–35% non-sugar carbohydrate; 7–10% protein as sodium caseinate; 11–15% emulsifiers as mono- and di-glycerides, propylene glycol esters of fatty acids) | 9–15 |
| Buttermilk solids | 9–11 |
| Cheese solids/flavor | 6–9 |
| Pregelatinized waxy maize starch | 6–9 |
| Tetrasodium pyrophosphate | 1.2–1.8 |
| Calcium orthophosphate | 0.8–1.2 |
| Vanilla flavors | 0.4–0.8 |
| Aspartame | 0.3–0.6 |
| Colors | trace |

For a total mix weight of about 144 grams, one and one-half cups of either whole or 2% low-fat milk is used to dissolve the mix using a household mixer. The hydrated mix is then poured into a Graham cracker crumb crust and chilled at refrigerator temperatures for several hours.

What is claimed is:

1. A dry mix capable of producing a stable, sugar-free filling for cheesecake when admixed with milk, without need for cooking or heating of the admixture, comprising a particulate and intimate admixture of milk solids in an amount of from about 30 to 65% by weight of the dry mix, fat in an amount of from about 5 to about 20% by weight of the dry mix, a pregelatinized starch thickening component, a source of cheese flavor and cheese solids, phosphate gelling agents capable of interacting with milk proteins to form a gelatinous structure in the cheesecake filling, an emulsifier component, a non-sugar sweetener in an amount sufficient to provide an acceptable degree of sweetness to the cheesecake filling, and from about 10 to about 35% by weight of a maltodextrin having a dextrose equivalent in the range of from about 3 to about 15 and a bulk density of at least about 10 pounds per cubic foot.

2. A dry mix according to claim 1 wherein said maltodextrin has a dextrose equivalent in the range of from about 9 to 12.

3. The dry mix according to claim 1 wherein said maltodextrin has a bulk density in the range of from about 10 to 25 pounds per cubic foot.

4. The dry mix according to claim 3 wherein said maltodextrin has a bulk density in the range of from about 13 to 19 pounds per cubic foot.

5. The dry mix according to claim 1 wherein the bulk density of the overall dry mix is at least about 25 pounds per cubic foot.

6. The dry mix according to claim 5 wherein the bulk density of the overall dry mix is from about 25 to 40 pounds per cubic foot.

7. The dry mix according to claim 6 wherein the bulk density of the overall dry mix is from about 29 to 34 pounds per cubic foot.

8. The dry mix according to claim 1 wherein said non-sugar sweetening agent is a dipeptide sweetener.

9. The dry mix according to claim 8 wherein said dipeptide sweetener is aspartame and is present in an amount of from about 0.3 to about 0.6% by weight of the dry mix.

10. The dry mix according to claim 1 wherein said milk solids comprise non-fat dry milk solids.

11. The dry mix according to claim 10 wherein said milk solids further comprise buttermilk solids.

12. The dry mix according to claim 1 wherein said fat is present in the form of powdered fat comprised of fat particles encapsulated in water-soluble carbohydrate and proteinaceous materials.

13. The dry mix according to claim 12 wherein said powdered fat further comprises emulsifiers.

14. The dry mix according to claim 1 wherein said fat is present in an amount of from about 5 to 10% by weight of the dry mix.

15. A sugar-free cheesecake filling prepared by hydrating the dry mix of claim 1 in an aqueous milk medium with agitation followed by cooling of said hydrated mix, the ratio of hydrating medium weight to dry mix weight being from about 2:1 to about 3:1.

* * * * *